INVENTOR
KARL EICKMANN

BY

ATTORNEYS

Oct. 15, 1968  K. EICKMANN  3,405,890
CONTROL MEANS IN FLUID-POWER DRIVEN, FLUID-BORNE VEHICLES
Filed May 24, 1966  6 Sheets-Sheet 2

INVENTOR
KARL EICKMANN

BY

ATTORNEYS

Oct. 15, 1968 K. EICKMANN 3,405,890
CONTROL MEANS IN FLUID-POWER DRIVEN, FLUID-BORNE VEHICLES
Filed May 24, 1966 6 Sheets-Sheet 3

Fig. 5

INVENTOR
KARL EICKMANN

Oct. 15, 1968 K. EICKMANN 3,405,890
CONTROL MEANS IN FLUID-POWER DRIVEN, FLUID-BORNE VEHICLES
Filed May 24, 1966 6 Sheets-Sheet 4

INVENTOR
KARL EICKMANN

BY

ATTORNEYS

INVENTOR
KARL EICKMANN
ATTORNEYS

Oct. 15, 1968         K. EICKMANN         3,405,890
CONTROL MEANS IN FLUID-POWER DRIVEN, FLUID-BORNE VEHICLES
Filed May 24, 1966         6 Sheets-Sheet 6

INVENTOR
KARL EICKMANN

BY

ATTORNEYS

United States Patent Office 3,405,890
Patented Oct. 15, 1968

3,405,890
CONTROL MEANS IN FLUID-POWER DRIVEN,
FLUID-BORNE VEHICLES
Karl Eickmann, 2420 Isshiki, Hayama-machi,
Kanagawa-ken, Japan
Filed May 24, 1966, Ser. No. 552,559
1 Claim. (Cl. 244—17.23)

ABSTRACT OF THE DISCLOSURE

The disclosure relates to fluid borne vehicles including a body and having at least a pair of propellers rotatably mounted on the body about symmetrically spaced axes such that, when the propellers are rotating at equal angular velocities, the vehicle maintains a stable attitude. Respective hydraulic motors are in driving relation with each propeller, and a source of working fluid under pressure is connected by supply and return lines to all of the motors to supply working fluid thereto at constantly proportional rates. Control means are selectively operable to vary the relative rates of supply of working fluid to the motors to selectively adjust the attitude of the vehicle, and the propeller axes may be tilted to change the direction of travel of the vehicle.

A feature of the disclosure is the provision of flow control rings surrounding each propeller and which are so designed that they act as lift surfaces for the vehicle. The control means may include bypass means between the supply and return lines connected to each motor and operable to bypass some of the fluid normally delivered to the respective motor and return it to the source of fluid under pressure. Thereby, the rates of operation of the respective motors may be varied. This bypass control is preferably used when pairs of motors are connected in series with each other.

The aircraft may be provided with wings which are spaced both horizontally and vertically of the body so that each propeller operates in a respective air stream, and these wings may be pivotal about axes, relative to the body, as well as being adjustable longitudinally of the body.

A further feature of the disclosure is the provision of a radar device which, through transistor amplifier means, controls a hydraulic control means for stopping motion of the vehicle through a fluid responsive to the presence of an obstruction in the intended direction of movement. When the vehicle is of the helicopter type, a swingable control vane may be provided in the air stream behind one or more of the propellers to assist in varying the attitude or the direction of flight of the aircraft.

Cross reference to related application

This application is related to my copending application Ser. No. 551,023.

Background of the invention

This invention relates to vehicles which are at least partially fluid-borne or move through fluid, and which may take off, fly, swim or land horizontally or vertically and which are driven by a plurality of propellers. The invention has a plurality of embodiments which partially are also suitable for supply or interchange to other vehicles or embodiments.

In my copending patent application a helicopter is disclosed which has substantially vertical axes of the propeller and of the hydraulic motors, which revolve the rotors or propellers. Two or more hydraulic motors are provided in one fluid circuit and variable bypass means are set for controlling or providing the flow of a quantity of fluid from the "supply passage" into the "return passage" of a respective propeller driving positive displacement fluid motor. Thereby the angular velocity of the respective propeller is slightly decreased, resulting in that the helicopter inclines to a certain extent in the direction of the slower revolving propeller. This inclination actuates or controls the movement of the helicopter in the respective direction.

It has now been discovered, in accordance with this present invention, that bypass-means between "supply passages" and "return-passages" of a positive displacement fluid motor can also control or actuate the attitude, flight, movement, rest or start or landing of fluid-borne vehicles, which are borne in or on fluid by wings or ringwing-means in combination with rotor means which are revolved by positive displacement fluid motors.

It is therefore an object of this invention to provide fluid flow control means between at least each two pipes or tubes of the hydraulic flow system of a hydraulically geared vehicle, which is borne by wings or ringwing means in combination with rotor means for changing the rotary velocity of the different propellers slightly relatively to each other.

Another object of this invention is to provide a safe two flow of multi flow driven wing- or ring-wing type fluid-borne vehicle, with moment equalization and at least one control valve between two pipes of each of the two-flows or of a plurality of two flows.

Still another object of the invention is, to provide ring means or annular ducts around the helicopters or propellers of the vehicle of this invention.

To provide hydraulically control means for inclining the axis of an annular ring means of duct means with a propeller and hydromotor therein, is still another object of the invention.

At least a part of the ring means or ducts may be so configured as to form lift means assisting horizontal or vertical flight of the vehicle, and this is another object of the invention.

A further object of the invention is to bear the vehicle by propellers and ducts or ring means during its move through fluid.

To provide a fluid-borne vehicle with a plurality of propellers located in ring means and driven by fluid motors with proportional rotary velocity connected in parallel or in series, is also an object of this invention.

Another object of the invention is to provide a fluid borne vehicle having a body and wing means connected to said body, a fluid flow producing means, hydraulic motors connected to said wing means, and propellers driven with substantially proportional rotary velocity by said hydraulic motors while said hydraulic motors are driven by fluid flow from said fluid flow producing means.

A further object of the invention is to set a plurality of wing means onto the body of the vehicle, so that the wings are spaced from each other in longitudinal direction and in vertical direction.

The next object of the invention is to utilize the difference in pressure in fluid lines before and after a hydraulic motor for actuating a control means for changing the attitude of the fluid borne vehicle.

To change the vehicle from vertical to horizontal location or movement by the pressure difference or a bypass of a part of the quantity of fluid passage before or after a hydraulic motor is another important object of the invention.

A further object of the invention is to balance or trim the vehicle by hydraulically operated movement of a balance or trim-weight, which might be a power plant.

Another object of the invention is to provide a fluid-borne vehicle, having a body, ring bearing means on said body and ring means or ring means borne by said wing bearing means able to pivot therearound, and having hydraulic motors connected to said wings and propellers connected to said hydraulic motors to be revolved thereby, while said hydraulic motors are driven by a flow of fluid from a fluid flow producing means.

It is another object of this invention to provide an aircraft which is driven or borne by propellers or rotors which are driven by a plurality of hydraulic motors producing a plurality of hydraulic flows which drive one or a plurality of hydraulic motors which directly rotate propellers of the aircraft.

Still another object of the invention is to provide a cycle of hydraulic flows from fluid flow producing means, such as a hydraulic fluid pump or a fluid flow producing combustion engine, to a first hydraulic motor and out from the first hydraulic motor into a second hydraulic motor and out from the second hydraulic motor back to the fluid flow producing means or to an additional hydraulic motor or motors and thereafter back to the fluid flow producing means.

Also an object of the invention is to drive propellers or rotors directly on the shafts of hydraulic motors.

Another object of the invention is to provide a helicopter or an aircraft with a plurality of rotors or propellers which are driven by hydraulic motors which are so arranged and operated that the helicopter or aircraft is maintained under all circumstances in a stable condition during operation.

It is another object of this invention to provide hydraulic motors with propellers on an aircraft or on a helicopter which can be taken in, or which can be swung into or on, the aircraft so that the aircraft is able to run as a vehicle on land or water.

Also it is a still further object of the invention to provide at least one horizontal propeller on an aircraft which is driven by a hydraulic motor, and which can be pivoted around an axis so that the thrust of the propeller can be changed into different directions.

A further object of the invention is to move wings on a fluid-borne vehicle forwards or backwards, changing the altitude of the vehicle and/or to change the vehicle movement to horizontal from vertical or vice versa and/or to actuate the forwards or backwards movement of a fluid-borne vehicle by a hydraulic means.

It is another object of the invention to control the forward, backward and vertical movement of a fluid-borne vehicle having a body, and wings or ring means connected to said body, and driven by propellers in turn driven by hydraulic motors connected in series with each other by by-passing fluid from a supply passage to a return passage.

A further object of the invention is, to incline a helicopter by means of increasing or decreasing the rotary velocity of at least one of the propellers by a speed variable hydraulic transmission or drive means and/or to do so on a generally mechanically driven helicopter and/or to do so by including a one-way clutch means or a plurality thereof into the drive means for driving a propeller shaft and directly or indirectly to a hydraulic motor.

Another object of the invention is, to provide a fluid-borne vehicle having contra-rotating propellers driven by hydraulic motors while the shaft of one of the hydraulic motors extends through a central bore of the other hydraulic motor and/or wherein said propellers are driven with substantial proportional rotary velocity by means of two flows of fluid of equal rate delivery quantity, or by connection in series in a fluid flow.

And a still further object of the invention is, to provide a radar means in a fluid-borne vehicle which senses objects which are relatively near to the vehicle and which are provided with a transmission means for transforming and/or strengthening radar impulses into hydraulic power for driving control means of the fluid borne vehicle and/or to control the altitude of the vehicle automatically by a combination of a radar-electronic hydraulic sensing control-transmission or power means.

For an understanding of the principles of the invention, reference is made to the following description of typical embodiments thereof as illustrated in the accompanying drawings.

Figure 1:
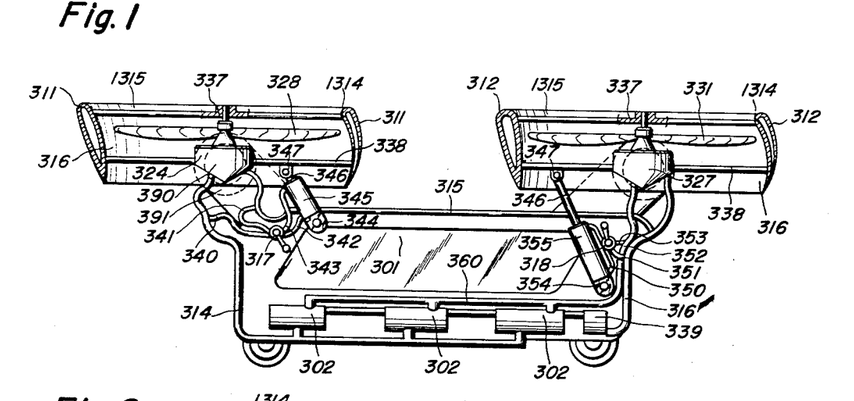
FIG. 1 is a side elevation view, partly in section, of one form of fluid-borne vehicle embodying the invention.
Figure 2:
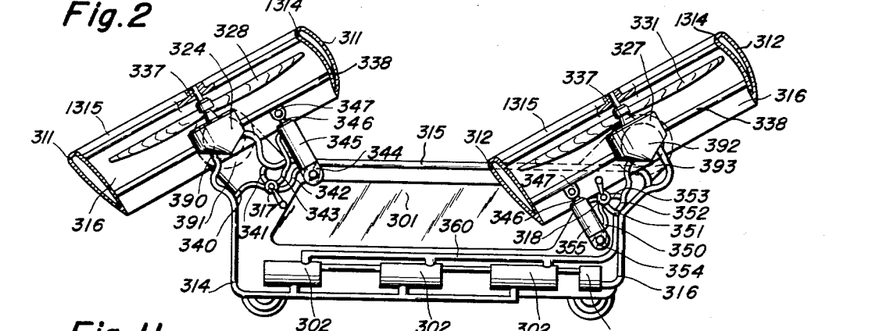
FIG. 2 is a view of the vehicle shown in FIG. 1, but with the propellers and ring means inclined.

In the embodiment of FIGURES 1 and 2 the same vehicle is shown. FIGURE 1 shows the vehicle ready for take off or landing in a vertical movement while FIGURE 2 shows the vehicle in a forward or inclining flight position. The speciality of the embodiment of FIGURES 1 and 2 is that annular ring means or ducts are provided around the hydraulic motor driven propellers, and the purpose of these ring-wings or ducts may be of different kinds. First of all such wings provide a bigger thrust for lifting the aircraft vertically. But according to the present embodiment of the invention, the axes of the motor, propeller and the surrounding ring means or duct may be inclined so that the aircraft may move forwards or backwards. The wing means or duct then acts as a ring-wing for bearing the vehicle through fluid f.i. through air.

For this purpose it is especially convenient to provide on the backwards part of the ring-wing a forward inclined nose means 1314 on ring-wing 312 so that during the horizontal or inclined flight the respective nose part 1314 gets almost the position of an aircraft wing and provides an additional lift to the fluid borne vehicle.

As seen in FIGURES 1 and 2 then the leftward parts of wing means or ring means or duct means 311 and 312 have almost the function of a wing for bearing an airborne vehicle while the rightward parts of ducts or ring means 311 or 312 with the thereon provided forwards inclined nose means 1314 also function as a wing of an aircraft and thereby provide additional lift for bearing the vehicle during its horizontal or inclined travel through the air or fluid.

Another feature of FIGURES 1 and 2 is that the axes of the motors, propellers and ducts can be inclined by an inclination actuator means 345 or 355. Such actuator means f.i. may be a hydraulic actuator means and it may be actuated by a difference in pressure in fluid in a pipe leading to a hydraulic motor and in a pipe extending from the hydraulic motor, by the difference of fluid pressure in different pipes. The inclination control means may be controlled by respective control means 317 or 318.

Body 301 of the vehicle contains the passenger or freight cabin, and one or several power plants 302 are mounted preferably beneath the body or on the floor thereof. These power plants are hydraulic fluid flow producing power plants and may produce two or more fluid flows. All the fluid flows are delivered into a delivery pipe 314 and into a delivery pipe 360, equal or proportional quantities being delivered into both of these pipes. Fluid delivered to supply line 314 flows through and operates hydraulic motor 324 and thereafter either returns directly to a tank through lines 315 and 316', or passes through cooling means 339. The second fluid flow in supply line 360 flows to hydraulic motor 327 to operate the same and may return through return line 316' to a tank 339 for cooling after which it is returned to the fluid flow supply or producing means. The vehicle may also be driven by a plurality of flows with equal or substantially equal delivery quantities, or it may be driven by fluid flows connected in series.

Motors 324 and 327 have revolving output shafts mounting respective propellers 328 and 331. Each propeller is surrounded by a duct or ring means 311 or 312, respectively, and these ring means may be attached to the motors by fastening means 338 or the like. The motor or propeller shafts may also be mounted in the fastening means 337. The ducts or ring wings 311 and 312 assist the thrust of the propeller and enable the vehicle to support more weight during take-off, landing, or travel through the air.

The inclination adjusting means 345 and 355 are connected between body 301 and respective fastening means 347. Each inclination controlling means is a hydraulic cylinder having a piston rod 346, and respective fluid flow passages 340–343 are connected between control valve means 317 and actuator means 345, or to the respective lines 314 and 315.

By means of the valve means 317, the fluid to be bypassed from the line at higher pressure into the line at less pressure is controlled and directed into one or the other cylinder chambers of the actuator means 345. Thereby, the axis of motor 324, propeller 328 and duct means 314 is inclined forwardly or backwardly by pivoting around bearing means 390 in mounting means 391. A substantially similar inclination actuator 355 is connected between body 301 and fastening means 338 of the righthand assembly, and may also be, for example, a double acting hydraulic cylinder having a hydraulic piston 346. Hydraulic cylinder 355 is controlled by valve means 318 connected with passage means 351, 352, 353 to actuator 355 or to fluid lines 316' 315 or 360. Actuator 345 may be mounted on bearing means 344 on body 301, and actuator means 355 may be mounted on bearing means 354 of body 301.

Fluid under pressure delivered from fluid flow producing means 302 enters line 314, flows through and operates hydraulic motor 324, and then is discharged into line 315 which is connected to return line 316' leading to cooler 339 connected to the intakes of the fluid flow producing means 302. Analogously, the fluid under pressure delivered to line 360 from means 302 flows through motor 327 and returns to line 316' to cooler 339. The control means 317 is connected, on the one hand, to the lines 314 and 315 and, on the other hand, to opposite ends of the piston-cylinder means 345, so that the control means 317 can direct fluid under pressure into either selected end of the piston-cylinder means 345 and exhaust fluid from the opposite end thereof. The control means 318 associated with the piston-cylinder means 355 is connected, on the one hand, to the lines 360 and 316' and, on the other hand, to the opposite ends of the piston-cylinder means 355.

By inclining the axes of the ducts, motors and propellers the forwards or backward movement of the vehicle can be controlled. Additionally by passing more or less flows from one of the passages to the other or by bypassing it from one passage into the other so that one or another of the motor means 324 or 327 is revolving with a respectively slightly higher rotary velocity, the inclination of the fluid borne vehicle, thereby the forwards or backwards travel, can also be obtained.

Figure 3:
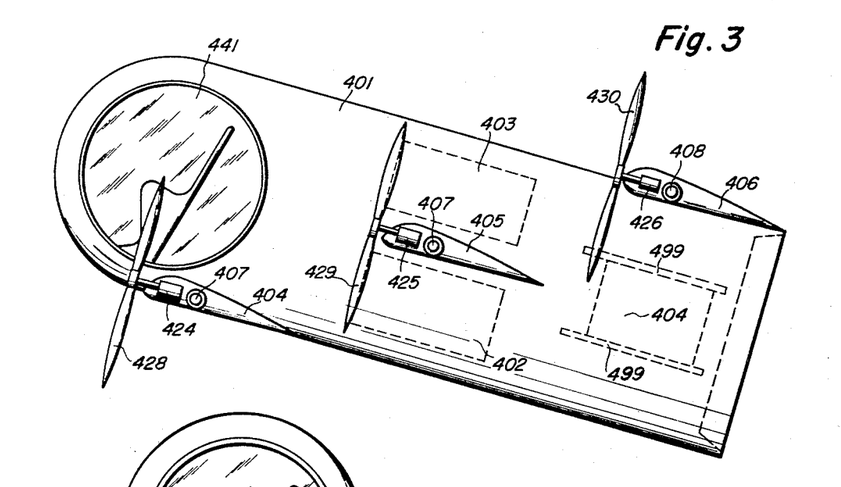
FIGS. 3 and 4 are side elevation views of another form of fluid-borne vehicle embodying the invention, FIG. 3 showing the vehicle with an inclined attitude and FIG. 4 showing the vehicle with a vertical attitude.
Figure 4:
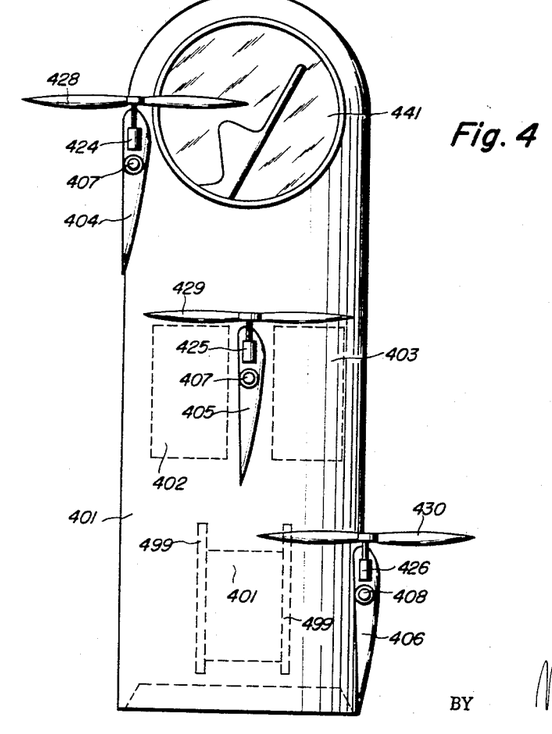
Figure 5:
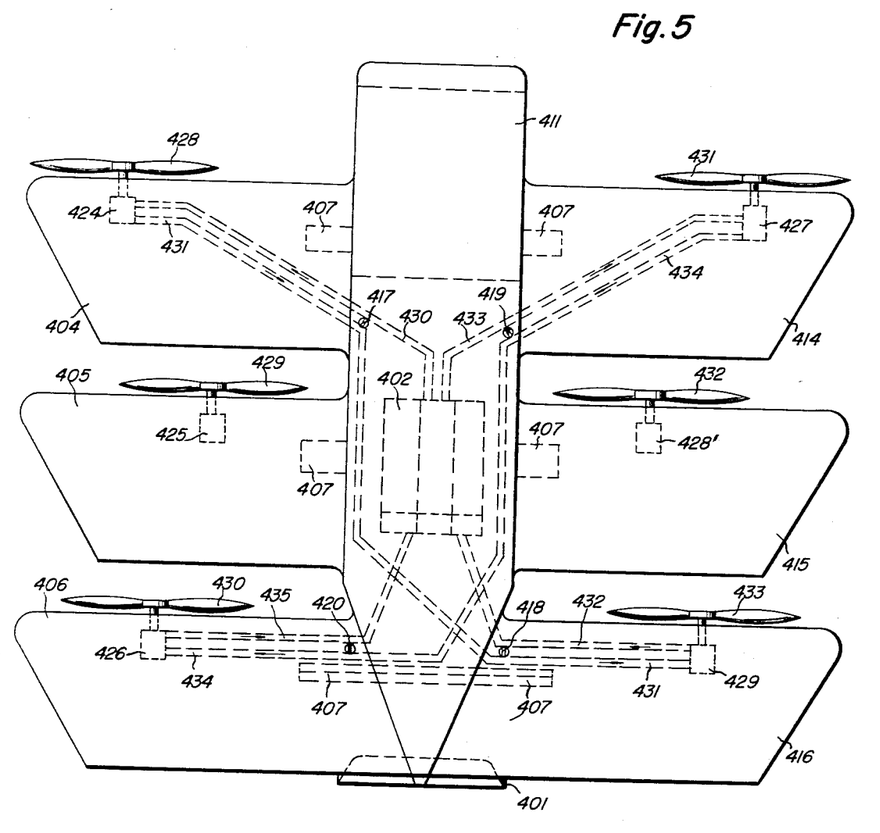
FIG. 5 is a plan view of the vehicle shown in FIGS. 3 and 4.

In the embodiment of FIGURES 3 to 5 a hydraulic driven fluid-borne vehicle is shown which may take off vertically or horizontally and which may fly vertically or horizontally or in an inclined direction, and which has the feature that wings are connected to the body of the aircraft.

Since the wings are connected to the body of the aircraft, the aircraft has a capability to bear better than common helicopters do. Another feature is that the hydraulic fluid which is used for driving the propeller motors can better be cooled by the air or fluid through which the vehicle moves. FIGURE 3 shows the vehicle in a forwards or inclined flight position, while FIGURE 4 shows the vehicle in a vertical take off or vertical landing position. FIGURE 5 shows the vehicle from above. As one feature of this embodiment there are three wings extending from the vehicle body 401 each in one horizontal position. In each of these wings, a hydraulic motor is located and drives the respective propeller on its shaft. The hydraulic motors are actuated by the fluid flow producing means which directs the fluid flow or fluid flows through passages to the respective motors for driving them. Since the wings are able to bear the vehicle in horizontal flight, the vehicle needs less power during horizontal flight while it needs its maximum power during take off and almost maximum power during a vertical landing. Since the vehicle is provided with wings the propellers can be considerably smaller than are the propellers in helicopter type vehicles.

As another feature of this embodiment, the wings are vertically and horizontally spaced from each other relative to the vehicle body 401. That has the feature that each propeller moves through a free fluid stream for the better drive of the aircraft or vehicle and for not disturbing the aerodynamics of fluid flow around the wings.

It was a custom in the earlier years of this century to provide double wings or triple wings in airborne vehicles. Those wings however were mostly not spaced sufficiently horizontally from each other, but only vertically spaced from each other, and that resulted therein that the upper wing influenced the lower wing and vice versa in a negative way so that the aircraft or fluid borne vehicle was not very efficient.

These disadvantages are overcome by the present invention, particularly as shown in the described embodiment, in which the propellers are spaced far enough from the wings that the propellers do not have a negative influence on the aerodynamic flow around other wings.

The provision of three wings is by way of example only as there could also be only one wing in each transverse direction or there could be two or more. The wings may also be provided with pivoting bearing means 407 for pivoting the wings through a limited extent. Such pivoting relative to body 401 may be actuated by inclination or pivoting actuator means and such actuator means may preferably be hydraulic, for instance hydraulic motors or hydraulic cylinders. Such hydraulic motors or hydraulic cylinders, which are not shown in the figures, may be driven by the difference of pressure in different passages for fluid flow and they may be controlled by respective control means.

Fluid-borne vehicle 401 includes a body 401 in which are mounted one or several power plants. In the embodiment, the power plants 402, 403 and 404 are provided. All of these power plants are fluid flow producing means. Preferably each of the fluid flow producing means is a two flow producing means for producing two flows of fluid of uniform delivery quantity. All first flows of the fluid flow producing devices may combine to form one flow system while the second flows may combine to form another flow system. But there also could be independent flows depending on the actual design and situation. As can be seen, body 401 has also a passenger or freight cabin 441. This may be pivotable so that the persons can comfortably rest during the vertical take off as well as during a horizontal take off as well as horizontal, vertical or inclined travel through fluid or air. The power plants are so located in the body that they balance the vehicle in itself, so that the vehicle has a stable position in air in a vertical attitude as well as in a horizontal attitude as also in an inclined attitude.

For this purpose one or more of the fluid flow producing means f.i. fluid flow producing means 402 may be movable axially along guide means 499 so the weight of the fluid flow producing means or power plant 402 may actually act as a trim means for trimming and balancing the weight of the aircraft during its movement through the fluid. One flow of fluid flows from the fluid flow producing means through passage means 430 for driving hydraulic motor 424. On the shaft of hydraulic motor 424 propeller 428 is provided. The fluid flow leaves the hydraulic motor 424 through the medial pipe 431 and passes through the second hydraulic motor 429 in series. Hydraulic motor 429 bears propeller 433 on its shaft and rotates this propeller. The return flow flows through passage means 432 back through a cooling means to a tank or to the fluid flow producing means. The other flow of fluid leaves the fluid flow producing means through passage 433 to hydraulic motor 427 and drives this motor. On the shaft of this motor propeller 431 is provided. The fluid leaves hydraulic motor 427 through medial pipe means 434 and flows then into the second hydraulic motor 426 in this series. On the shaft of hydraulic motor 426 another propeller 430 is provided and driven by motor 426. The return flow leaves motor 426 through return pipe 435, preferably via tank or cooler means, and returns to fluid flow producing means 402, and thereby the fluid flow circuit is completed. Propeller 428 is provided on the forward and left wing 404 while the propeller 433 is provided on the backwards right wing 416. Thereby the hydraulic motors 424 and 429 with their propellers 428 and 433 are provided on two extremities of the body 401 of the fluid borne vehicle. Motor 427 with propeller 431 is provided on the forward right wing 414 of the body while motor 428 with propeller 430 is provided on the left back wing 406 of the vehicle. Thereby the first motor of this fluid flow in series is on one extreme of the vehicle while the second fluid flow in this series is on the other extremity of the body. By this arrangement, the cited four hydromotors and propellers keep the vehicle completely balanced in the air for a correct take off, landing or travel. The additional motors 425 and 428' and propellers 429 and 432 may be provided on the medial left wing 405 and the medial right wing 415 and they may be driven by additional flows of fluid or by the same flows of fluid, preferably with equal velocity.

A valve means 417 is provided between delivery passage 430 and medial passage 431, and a valve means 419 is provided between delivery passage 433 and medial passage 434. By opening valve means or bypass means 417 or 419 a limited extent the propeller motors 426 and 429 receive a larger quantity of fluid for faster movement. That results therein that the backwards part of the vehicle gets a bigger lift or a bigger forward movement, and thereby inclines the vehicle from a vertical position to a more horizontal position, depending on how long and how widely the valve means 417 or 419 are opened. Additional valve means 420 and 418 may be provided between the respective medial type medial passages and the return flow passages. For instance valve means 418 is provided between intermediate pipe 431 and return flow pipe 432. Valve means 420 may be provided between medial passage 434 and return passage 435. By opening valve or bypass means 418 or 420 slightly the respective hydromotors 424 and 427 with propellers 428 and 431 are speeded up. Thereby the whole vehicle can be lifted or pivoted from the horizontal forward position into a vertical position. The speed of such pivoting or inclination depends on how much the respective valve means are opened. Furthermore by opening only one or another of the valve means the vehicle may be turned left or right. Thus the whole vehicle may be controlled by hydraulic bypass or valve means. Additionally, delivery quantity variability devices for the fluid flow producing means may be provided, so that the overall rotary velocity of the propellers can be controlled thereby and so that the forward speed or the lifting capacity or setting down capacity and speed of the vehicle can repectively be controlled.

Figure 10:
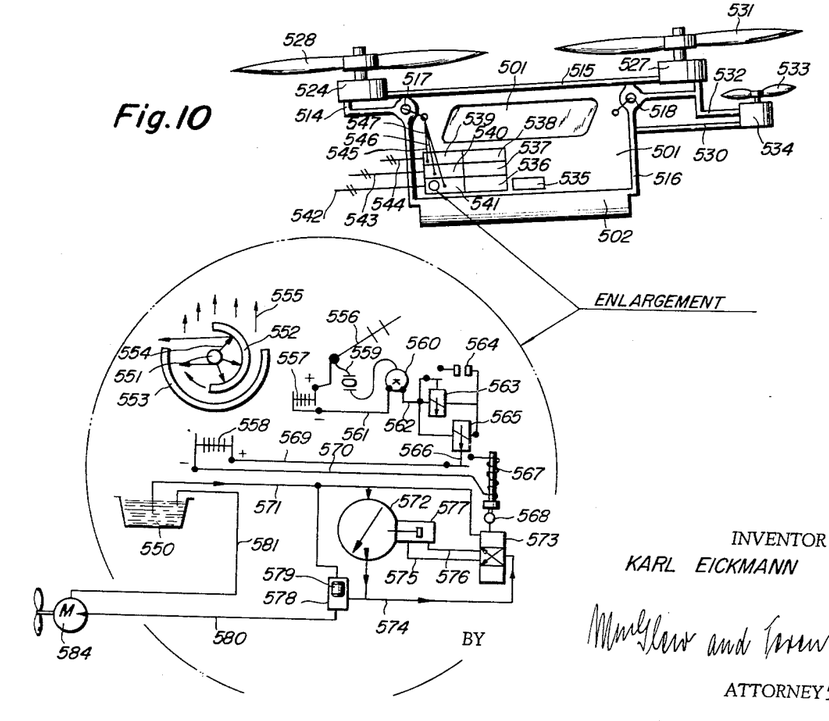
FIG. 10 is a side elevation view of a vehicle embodying the invention including a radar triggered hydraulic control means for preventing collisions with objects in the path of the vehicles.
Figure 11:
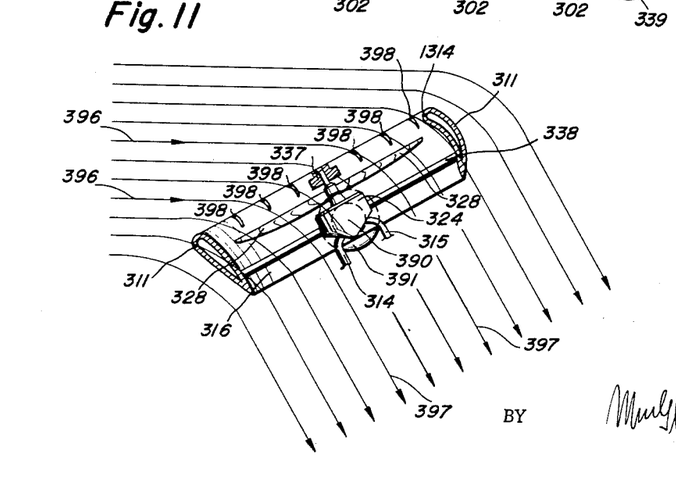
FIG. 11 is a sectional view of a control ring or ring-wing, in accordance with the invention, illustrating the air flow therethrough and illustrating flow guide means.
Figure 12:
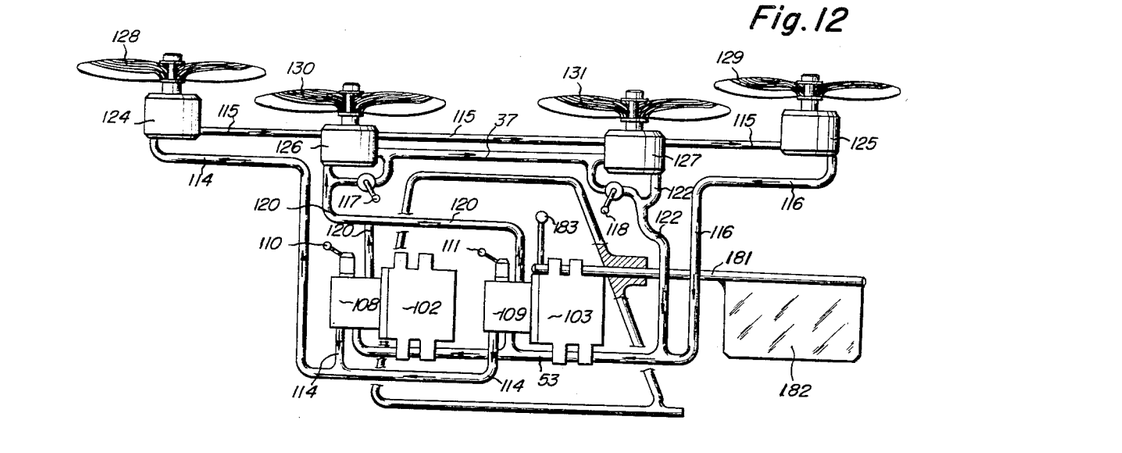
FIG. 12 is a plan view of another form of vehicle embodying the invention and including a control wing.

The hydraulic motors may have various arrangements on the respective base or body, and one such arrangement is illustrated, by way of example, in FIGS. 10–12. Other arrangements are also possible, and the difference in pressures in different passages may be used for actuating control means for controlling the hydraulic operated aircraft of the embodiment of FIGURES 3 to 5.

Figures 6, 7:
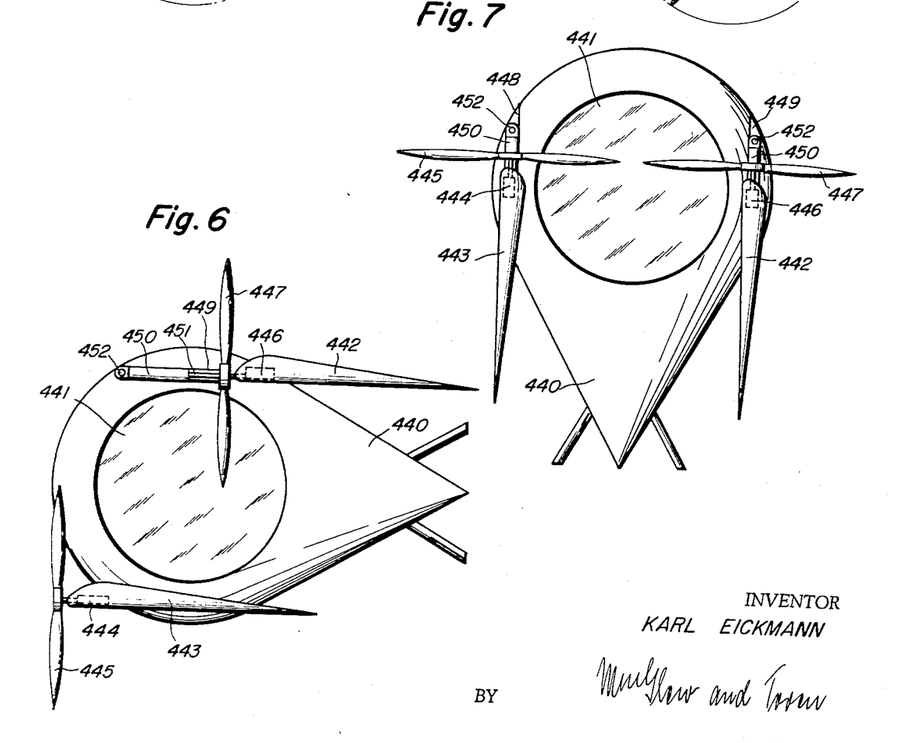
FIGS. 6 and 7 are side elevation views of another form of fluid-borne vehicle embodying the invention, FIG. 6 showing this vehicle with a horizontal attitude and FIG. 7 showing the vehicle with a vertical attitude.
Figure 8:
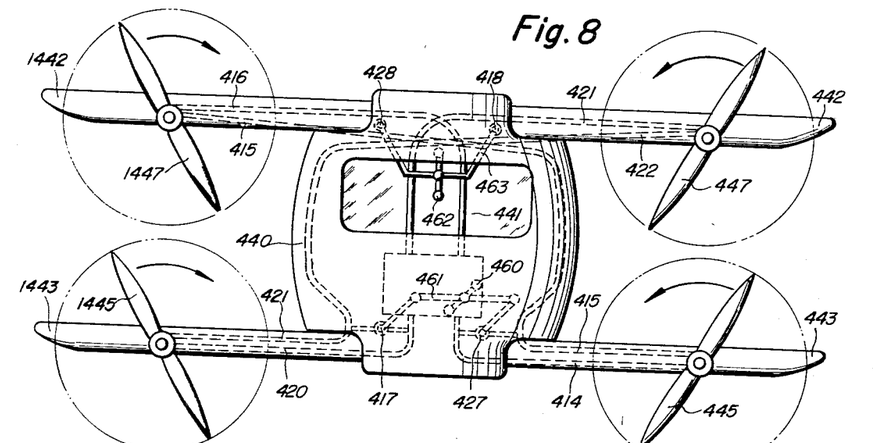
FIG. 8 is a front elevation view of the vehicle shown in FIGS. 6 and 7.
Figure 9:
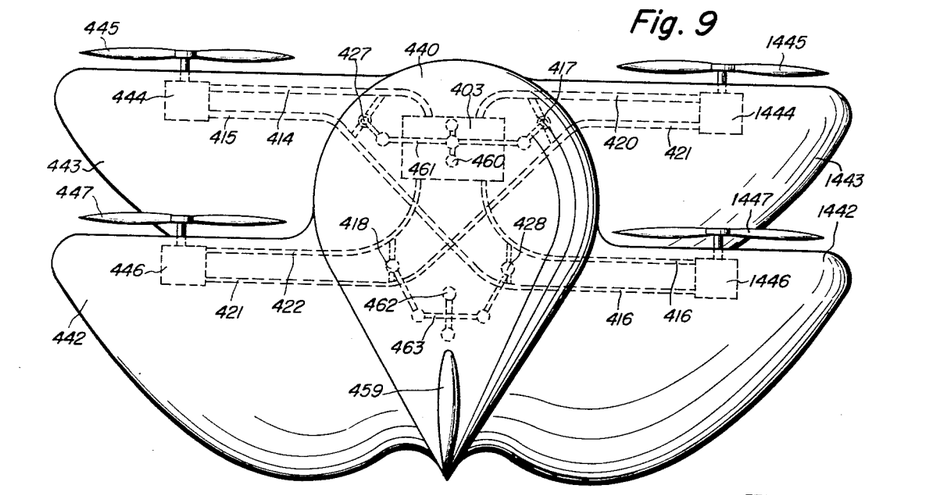
FIG. 9 is a plan view of the vehicle shown in FIG. 8.

The embodiment of a fluid borne vehicle in FIGURES 6 to 9 is also a vehicle having a body and wings connected thereto as is for instance shown in FIGURES 3 to 5. FIGURE 7 represents the vehicle in a vertical attitude, FIGURE 6 represents a vehicle in a horizontal attitude, FIGURE 8 shows the vehicle from the front and FIGURE 9 shows the vehicle from above. Body 440 is provided with wing means 443 and 442. Each one of these may extend to the left side or to the right side of the vehicle. The vehicle may also have a cabin 441. Hydromotors 444, 446 may be provided in or on the wing means 442 and 443, and on the shaft of the respective motors propellers 445 or 447 may be provided and be driven by the said hydraulic motors. A fluid flow producing means is provided in the respective body 404 and provides the flow of fluid either in parallel or in series or with substantial equal delivery quantity, to the respective hydraulic motors 444 and 446 or more of them.

The special feature of the embodiment of FIGURES 6 to 9 is that the wings 442 and/or 443 are movable axially or longitudinally of the axis of the body 440. The forwards or backwards movement of the wing 442 or 443 may be actuated by an actuator means 450 or by a plurality of such actuator means.

Such actuator means may be hydraulic motors, hydraulic cylinders, or the like. In the example, a hydraulic cylinder 450 is borne by bearing means 452, and inside of cylinder 450 is a double acting hydraulic piston 451 which is connected to the respective wing 442 or 443. The wing 442 or 443 may be slidable in respective guideway 448 or 449 for forwards or backwards movement. The respective hydraulic actuator means 450 may be supplied with fluid under pressure from one or more of the passages for supplying fluid to the hydraulic motors, or may be actuated by special fluid supply means. The pressure difference between different fluid flow passages may be used to actuate the actuator means 450 and the quantity and time of letting actuator means 450 move may be controlled by respective valves or control means, or variable or other pump means. By moving the wings 442 and 443 into corresponding longitudinal positions on body 440, the vehicle is ready for vertical take off or for vertical landing. By moving wing 442 or 443 forwards and another of them backwards, the vehicle is in a very convenient stable position for a horizontal flight through the air or movement through water. The vehicle may again be either a water or air borne vehicle.

Figure 13:
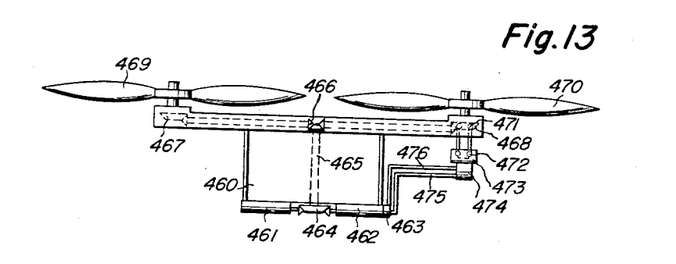
FIG. 13 is a somewhat schematic illustration of the driving means of another form of vehicle embodying the invention.

The embodiment of FIGURE 13 represents another embodiment of the invention wherein a fluid borne vehicle, preferably a helicopter, is driven by mechanical drive means for driving the propeller but wherein an additional hydraulic motor means is provided for increasing or decreasing the rotary velocity of one of the propellers relatively compared to the rotary velocity of the other propeller, for inclining the vehicle or for controlling the forwards or backwards or landing movement of the vehicle. For this purpose plural, for example two, power plants 461 and 462 are provided. They have a common differential gear means 464 which is borne on body 460 and shaft means 465 extends from gear means 464 to differential gear means 466. Both power plants 461 and 462 drive the gear means so that, if one of the power plants fails, the other continues to operate the vehicle. Additional gear means 467 and 468 are provided. Gear means 467 is connected to gear means 466 and drives propeller 469. Gear means 468 is connected to gear means 466 and drives propellers 470. Thereby both propellers 469 and 470 would revolve with equal rotary velocity.

However, a one-way clutch device 471 is driven by gear means 468 and operable, when the angular velocity of gear means 468 exceeds the angular velocity of the shaft of propeller 470, to drive propeller 470 through gear means 468. A reversible hydraulic motor 473 is connected, through a housing 474 containing a rotary part of the motor, to lines 475 and 476 connected to a fluid flow producing means 463 supported on body 460. Hydraulic motor 473 is connected through a second one-way clutch 472 to the shaft driving propeller 470 and operates, in such a manner that, when the shaft of propeller 470 is operating at a higher angular velocity than motor 473, the clutch 472 is effectively disconnected. However, when motor 473 has a higher angular velocity than the shaft of propeller 470, clutch 472 engages and clutch 471 disengages so that propeller 470 is driven at a higher angular velocity than propeller 469. Thereby, the vehicle can incline and thus move forwardly. A backward movement is made possible by reverse operation of hydraulic motor 473. Instead of one motor 473, more than one may be provided in connection with more than one propeller.

Figure 14:
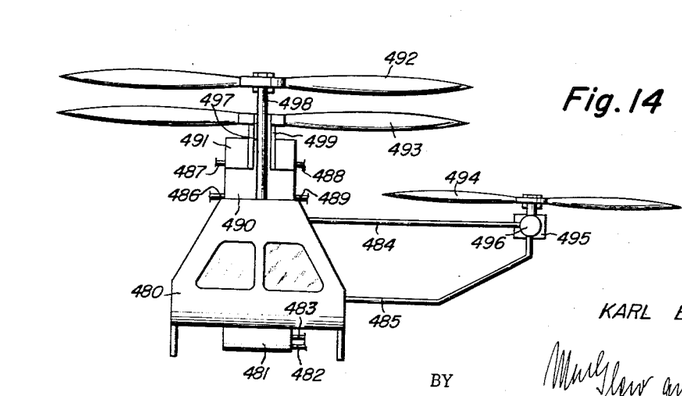
FIG. 14 is a front elevation view of still another form of vehicle embodying the invention.

In the embodiment of FIGURE 14 two counter rotating propellers 492 and 493 are provided on the body 480 of the vehicle. Preferably the propellers are provided on top of the vehicle.

Each of the propellers 492 and 493 is fastened to a respective shaft 498 or 499 of a hydraulic motor 491 or 490. Hydraulic motors 490 and 491 are contra rotating. Shaft 497 of hydromotor 490 extends through a bore 497 in shaft 499 of hydromotor 491. Since shaft means 499 of hydromotor means 491 has a bore through its center, shaft means 498 can extend therethrough and rotate contrary to shaft means 499. Shaft means 498 bears propeller 492 and is actuated by hydromotor means 490. Propeller 493 is borne by shaft means 499 and is actuated by hydromotor means 491. Each hydromotor 490 and 491 has two passage means. Hydromotor 490 has the passage means 486 and 489; while hydromotor 491 has the passage means 487 and 488.

Fluid flow producing means 481 is provided on body 480, preferably on its bottom for keeping the aircraft respectively balanced. From fluid flow producing means 481 passage means 482 and 483 extend. Fluid flow producing means 481 may for instance produce one flow of fluid. In such a case fluid may flow from fluid flow producing means 481 to passage means 482 into passage means 486 for revolving hydromotor 490 and it may leave hydromotor 490 via passage means 489 for entering hydraulic motor 491 via passage means 488 and thereby revolve motor 491 in series connection and oppositely to motor 490. The fluid may leave motor 491 through the return passage 487 into return passage 483 and therefrom, if necessary through a cooler or a tank means, back into fluid flow producing means 481. If on the contrary fluid flow producing means 481 is a two flow fluid flow producing means which produces two flows of equal fluid then passages 482 and 483 may both be delivery passages. Then delivery passage 482 may supply fluid under pressure into passage 486 for entering motor 490 and driving the latter and for returning through return flow passage 489 directly or indirectly to fluid flow producing means 481.

The second flow of fluid may then leave the fluid flow producing means 481 through passage means 483 and enter hydromotor 491 through passage means 488 for driving shaft 499 of hydromotor 491 in an opposite rotary direction compared to shaft 498 of hydromotor 490. Return flow may leave the hydromotor 491 through passage means 487 for directly returning to fluid flow producing means 481. Thereby the contra rotation of the propellers 492 or 493 with equal rotary velocity or substantial proportional rotary velocity is definitely achieved. The vehicle may be provided with an additional hydraulic control motor 495 which may be pivotable around a bearing means 496. Propeller 494 may be borne on the shaft of hydromotor means 495. Hydromotor means 495 may be driven by hydraulic fluid which flows to or from the motors through passage means 484 or 485. The rotary velocity of motor means 495 and propeller 494 thereon may be controlled by respective controls means f.i. similar to other figures or embodiments of this invention.

In the embodiment of FIGURE 10, a fluid borne vehicle is provided which is substantially similar to the fluid borne vehicle of my above mentioned co-pending patent application S.N. 568,820. It may however have an additional motor 534, with a propeller 533 thereon, which is driven by hydraulic fluid which flows through passage means 532 and 530. The fluid borne vehicle consists of a body 501 having a power plant or a plurality or power plants of fluid flow producing devices 502, and a delivery passage means 514, a medial passage means 515 and a return flow passage means 516 for driving hydromotors 524 and 527 with propellers 528 and 531 borne on their shafts and connected in series for driving them at substantial equal rotary velocity. Valve control means 517 and 518 may be provided for varying the rotary velocity of propellers 528 and 531 relative to each other for changing the attitude of the fluid borne vehicle f.i. for directing its forwards, backwards or other movement.

The feature of this embodiment of the invention is that this vehicle is provided with an automatically operated hydraulic and radar control means for stopping the vehicle automatically if it nears an object or if an object gets near to the vehicle. For this purpose radar antennas 544, 543 and 542 are provided. Antenna 542 is a long distance antenna, 543 a medium distance antenna and 544, a short distance antenna. The said antennas are actuated by the radar means 539, 540 and 541. Radar means 541 is a long distance control means, radar means 540 is a medial distance control means and radar means 539 is a short distance control means. Power increase and control power means 538 is connected to control means 539. Power increase means 537 is connected to control means 540 and power increase means 536 is connected to control means 541. In the enlargement, an example of an embodiment of the control and power means 540 and 536 is schematically shown to a larger scale. Radar sender 551 transmits radar impulses 554. Rotary radar impulse direction means 552 is provided and revolves around antenna 551. A fixed impulse direction means 553 is also provided. By revolving direction means 552, the radar impulses are so directed that they leave the impulse direction means 553 in substantially one direction in a certain sector forward and away from the vehicle. These radar impulses are shown at 555. If these impulses 555 meet an object in the neighborhood of the vehicle, they are reflected to antenna means 556. Antenna means 556 has an electric potential applied thereto from battery or power supply means 557.

The impulses received at antenna 556 are transmitted through crystal 559 to one electrode of transistor 560 which has another electrode connected to the negative terminal of source 557. Through conductor 562 connected to a third electrode of transistor 560, the received impulse is used to energize a relay 563 having a condenser 564 coupled therewith, relay 563 and condenser 564 controlling energization of a second relay 565. When relay 565 is transferred, its armature 566 closes an electric energizing circuit for an electromagnetic energizing means 567 which has a relatively strong potential supplied thereto from a potential source 558 through conductors 569 and 570. If those reflected pulses returning parallel to the pulses 555 and received by antenna means 556 are reflected by an object in the path of the vehicle and are sufficiently strong, electromagnetic actuator means 567 is energized. Actuator means 567 is connected by a clutch means 568 to, for instance, a hydraulic control means, like a hydraulic valve means 573. This may be a four-way control valve and may pass fluid through passage means 575 and 576 into a control means 577 for adjusting the delivery quantity of a variable pump means 572. Variable pump means or fluid flow supply means 572 may either be driven by a power plant or may be a hydraulic motor driven from another hydraulic current which is applied or existing in the vehicle. A control cylinder 578 with a piston 579 therein may also be provided, and passage means 574 may lead from the variable power supply or pump means 572 to valve means 573. From a flow current in the helicopter or from tank 550, fluid may be supplied to the variable fluid power supply 572. The quantity of flow current which is then delivered from fluid flow supply 572 via control means 578, 579 through passage means 580 flows to motor means 584 for propeller means 584, and therefrom through pipe 581 return to tank 550.

Instead of sending a fluid flow through passage means 580 to a hydraulic motor 581 which may be the actual motor 534, 527, or 524 of the fluid-borne vehicle, it is also possible to send the flow of fluid through passage means 580 into an actuator means 584 for actuating control valves 517 or 518. Respective connection means 545, 546 or 547 may be set to the other control means 539, 540 and 541 or 538, 537 or 536. In any case the principle of the radar hydraulic automatic aircraft is that transmitted radar pulses, if they are reflected by an object in the path of the vehicle, return to the vehicle, are received on antenna 556 and are used, through a transistor amplifier, and associated relays, and an electromagnetic actuator to control the hydraulically operated motors of the vehicle. By this control, the vehicle may be slowed or it may be stopped in the air. Also, the vehicle may be made to move backward or vertically to avoid any collision. Thus, collisions between airborne vehicles, for example, can be effectively prevented by the system of the invention.

Control means 535 may be an altitude control means and may be responsive to the density of the fluid wherein the vehicle is borne. Thereby the aircraft or vehicle can be restricted to a maximum altitude or to a maximum altitude above ground. If such an automatic altitude control and adjusting means 535 is provided, it will use its measurement impulses for controlling a hydraulic control means for controlling either the rotary velocities and power of the power plants or for controlling the delivery quantity of flows out of the fluid flow producing devices. As soon as the maximum altitude is reached, it will decrease the delivery quantity of the fluid flow producing means and thereby prevent the vehicle climbing to a still higher altitude. If all vehicles of this kind are provided with such altitude control means 531, then no vehicle could exceed a certain altitude and the airspace above the earth could be limited to a certain altitude for airborne vehicles as shown in this invention. The higher altitude airspace could be spared for faster flying vehicles or for intercontinental or far distance service.

In FIG. 11 a ring means 311 surrounding propeller 328 and hydraulic motor 390 like in FIGURES 8 and 9 as shown again. The embodiment of the invention illustrated in FIG. 11 differs from the embodiment shown in FIGURES 8 and 9 insofar as, in the embodiment of FIGURE 11 air flow or fluid flow guide means 398 are provided in or before wing means 311 before propeller 328.

If a helicopter moves with rapid forward speed through air, each propeller arm moves through the air once against the movement direction and once with it during each revolution. That results in different torques and lift capacities of the propellers during each revolution in flight. As known, that is the reason for vibrations, if the helicopter flies with high speed or through wind.

The air flow guide means 398 are so set, before propellers 328 into ring means 311, that they direct the relative fluid or movement into a direction substantially parallel to the propeller axis. Guide means 398 change the relative flow direction from direction 396 before the guide means 398 into direction 397 after the guide means. Thereby a corrected flow of fluid or air to the propeller 328 is assured and vibrations are prevented so that the vehicle can move with high speed also with non-adjustable propeller blades of propeller 328.

The fluid/or air flow—guide means 398 may also act as bearing wings, if the axis of ring means 311 is inclined during flight of the vehicle. Thereby they may not only guide the air to the propeller, but also at the same time provide an increased lifting capacity to the vehicle by creating an upwards directed lifting force during flight through air or fluid.

It will be understood that the various features shown in the different embodiments of the invention may be combined with each other in different embodiments.

For obtaining the full advantages of the fluid-borne vehicle of this invention powerful and less heavy power plants, hydraulic motors and fluid flow producing means should be utilized, for instance gas-turbines 1 lb./HP or less weight.

Pumps, which are variable and able to be flanged to engines or gas turbines, are shown in my U.S. Patent application S.N. 389,130, now U.S. Patent No. 3,304,883, and they are of 0.5 lb./HP weight only. Powerful less heavy hydraulic motors are disclosed in my U.S. Patent 3,158,103.

To combine such means of my other patents or patent applications with the present invention leads to especially efficient economic and durable fluid-borne vehicles.

Referring now to the figures again, it would be required that, if a backwards vertical propeller or a forward one revolves faster or slower compared to the other propeller or propellers, that will not only result in increase or decrease of the lifting capacity of the respective propellers and in forward and backward inclination of the vehicle, but also in an increase or decrease of the torque of the respective propeller during its rotation through fluid. That in consequence results in a right or left turn of the vehicle, in other words in a turn of the vehicle around its vertical axis.

In order to adjust such turning tendency, the control ring or control radar 182 in FIGURE 12 or other suitable control means may be provided on the vehicle. In FIGURE 12 for example control wing 182 is borne on shaft means 181 which is borne in the vehicle and controllable, for example, by handle or controller 183. Wing 182 may be located in the fluid steam of a propeller f.i. of propeller 129. Thus if the wing 182 pivots around axis 181 the wing creates a torque for turning the vehicle around its vertical axis.

This torque will be used either to act against the undesired propeller torque during propeller speed changes or it will be used for letting the vehicle fly a curve or curves. There may be a plurality of such wings 182 provided in order to make sidewards movement of the vehicle possible.

It should be appreciated that such kinds of vehicles and the means of this invention need not be used as a helicopter or aircraft only but also for an aircushion vehicle which might hover near the surface, thereby using the known air cushion effect or in other vehicles. In such cases, respective covers may surround the propellers of the vehicle so that the cushion effect over the surface of the earth or water can be obtained.

Though the inventions are described by way of some embodiments, it should be understood that modifications or other combinations are possible, depending on design consideration or on the actual situation, without departing from the scope of this invention. Especially it is possible and often convenient to supply means of one or more embodiments of this invention to another or other embodiments of the invention or to interchange parts from one figure to another or features of one embodiment to another or others.

Having thus fully described my invention, it should be understood that modifications of this invention are possible. The embodiments of the invention are shown in the figures by way of example only and it is possible to modify the invention without departing from the scope of the invention. It is therefore intended that the patent shall include whatever novelty or feature resides in the invention and that the patent shall be covered by the following claims.

What I claim is:

1. A fluid-borne vehicle, comprising, in combination, a body; two pair of wings extending laterally from said body, the wings of each pair extending to opposite sides of said body; said two pairs of wings being arranged at respective different heights of said body; means mounting said wings for limited displacement longitudinally of said body; a plurality of propellers, each rotatably mounted on one of said wings and located at axes spaced symmetrically of the vehicle such that, when said propellers are rotating at equal angular velocities, said vehicle maintains a stable attitude; respective hydraulic motors each driving one of said propellers; a source of working fluid under pressure; supply and return lines connecting said source to all of said motors to supply working fluid thereto at constantly proportional rates; control means selectively operable to vary the relative rates of supply of working fluid to said motors to selectively adjust the relative speeds thereof to adjust the attitude of said vehicle; respective hydraulic actuator means each connected between said body and one of said wings and operable to adjust the associated wing longitudinally of the body; and further control means operable to selectively supply hydraulic fluid to said hydraulic actuator means.

References Cited

UNITED STATES PATENTS

| | | | |
|---|---|---|---|
| D. 138,538 | 8/1944 | Clerc | 244—55 X |
| 1,827,438 | 10/1931 | Rauch | 244—53 X |
| 1,839,563 | 1/1932 | Kingaman | 244—93 X |
| 1,939,156 | 12/1933 | Wright | 244—53 |
| 2,212,490 | 8/1940 | Adler | 244—53 |
| 2,428,475 | 10/1947 | Swaab | 244—93 X |
| 2,486,049 | 10/1949 | Miller | 115—34 X |
| 2,487,020 | 11/1949 | Gilcrease. | |
| 2,499,349 | 3/1950 | Ayres | 244—77 |
| 2,504,767 | 4/1950 | Wallis | 244—46 |
| 2,514,822 | 7/1950 | Wolfe | 244—17.23 X |
| 2,916,832 | 12/1959 | Hofmann | 244—17.19 X |
| 2,977,258 | 8/1961 | Purpura | 244—23 |
| 3,049,321 | 8/1962 | Nichols | 244—17.19 |
| 3,088,695 | 5/1963 | Clark | 244—12 |
| 3,089,666 | 5/1963 | Quenzler | 244—7 |
| 3,234,856 | 2/1966 | Martin. | |
| 3,253,807 | 5/1966 | Eickmann | 244—17.23 |

FOREIGN PATENTS

| | | |
|---|---|---|
| 1,148,657 | 6/1957 | France. |

MILTON BUCHLER, *Primary Examiner.*

P. E. SAUBERER, *Assistant Examiner.*